United States Patent [19]

Poetsch

[11] Patent Number: 4,752,821
[45] Date of Patent: Jun. 21, 1988

[54] METHOD AND APPARATUS FOR CORRECTION OF A TELEVISION LUMINANCE SIGNAL

[75] Inventor: Dieter Poetsch, Ober-Ramstadt, Fed. Rep. of Germany

[73] Assignee: Robert Bosch GmbH, Stuttgart, Fed. Rep. of Germany

[21] Appl. No.: 52,578

[22] Filed: May 20, 1987

[30] Foreign Application Priority Data

Jun. 11, 1986 [DE] Fed. Rep. of Germany ....... 3619663

[51] Int. Cl.$^4$ .............................................. H04N 5/14
[52] U.S. Cl. ......................................... 358/39; 358/30
[58] Field of Search ....................... 358/39, 30, 40, 37, 358/28, 22

[56] References Cited

U.S. PATENT DOCUMENTS 4,410,908 10/1983 Belmaves-Sarabia et al. ....... 358/30
4,597,006 6/1986 Orsburn ................................ 358/22

*Primary Examiner*—Howard W. Britton
*Assistant Examiner*—Victor R. Kastak

*Attorney, Agent, or Firm*—Frishauf, Holtz, Goodman & Woodward

[57] ABSTRACT

Color differences between primary color components obtained from a matrix in the usual way are combined by pairs in six non-additive mixers in a known way to produce six color sector signals. In a known system, these sector signals are individually amplitude adjustable for color correction purposes. In order to provide a correction for the luminance signal corresponding to the color corrections that may be made, a low pass-filtered luminance signal is used to multiply either all of the sector signals individually before amplitude adjustment or to multiply their sum after amplitude adjustment, the ultimate product-sum in each case being added to the full-band luminance signal for provision of a corrected luminance signal. The final addition can be eliminated if multiplication of the summation by the unfiltered luminance signal, but in this case it is necessary to add a constant to the sum of adjusted sector signals to serve as the multiplier input when no luminance correction is necessary and it is also then necessary to filter out the product frequencies higher than 5 MHz from the multiplier output that then serves as the corrected luminance signal.

18 Claims, 6 Drawing Sheets

METHOD AND APPARATUS FOR CORRECTION OF A TELEVISION LUMINANCE SIGNAL

This invention concerns correction of a television luminance signal in a color television system in which a sector signal is provided by subtraction and non-additive mixing for selected sectors of the color circle, the amplitude of the sector signal being adjustable.

It is often necessary in the transmission of color films to modify video signals in such a way as to correct previously incurred color errors. Many different processes have already become known for this purpose, sometimes for adapting different color television cameras to each other and sometimes for artistic modification of the colors of pictures registered in a camera.

One method for adjusting the hue and saturation of colors in six sectors of the color circle in a manner to a great extent independent for the respective sectors was disclosed by J.F. Monahan and R.A. Dischert, "Color Correction Technics for Television Cameras", Journal of the SMPTE, Vol. 78, September 1969, pp. 696–700. In this known method by obtaining differences between the values of primary colors and then non-additive mixing, there are derived sector signals respectively for the primary colors red, green and blue, as well as for their complementary colors cyan, purple and yellow. Each of the sector signals can be utilized for changing the hue and the saturation. The amplification of the sector signals is individually adjustable, so that six adjustable correction signals for hue and six adjustable correction signals for saturation are available. Only the colors lying in one sector of the color disk are affected by adjustment of any one correction signal. The central white point also remains unchanged.

From U.S. Pat. No. 4,410,908, it is also known to produce a luminance signal from sector signals derived as described above. This luminance signal is added to a luminance signal obtained from a luminance matrix. In that way, the light intensity of a reproduced picture can also be corrected for surfaces of various colors independently of each other.

In that known process, however, the corrections are not adapted to the luminance values of the original sector color.

SUMMARY OF THE INVENTION

It is an object of the present invention to provide a method and apparatus for correction of a luminance signal in a system of the kind described above in which the hue and saturation of six color sectors can be independently varied.

Briefly, the luminance signal is multiplied with the sector signals to provide the desired correction. This has the advantage that the corrections of the luminance are compatible with the respective luminance values of the colors to be corrected. In contrast with the known methods for luminance corrections derived from the adjustable sector signals, no luminance signal is produced from those sector signals and instead a correction signal is obtained which is multiplied by the luminance signal.

It is particularly advantageous to provide bandwidth limitation for the luminance signal before multiplication, and then to superimpose the luminance signal which is not band-limited upon the signal produced by multiplication.

Further details of the invention, particularly with respect to the apparatus used, are described in a more extensive description that follows.

BRIEF DESCRIPTION OF THE DRAWINGS

The invention is further described by way of illustrative example with reference to the annexed drawings, in which.

Identical components are provided with the same reference numerals in the several figures.

DESCRIPTION OF THE ILLUSTRATED EMBODIMENTS

Figure 1:
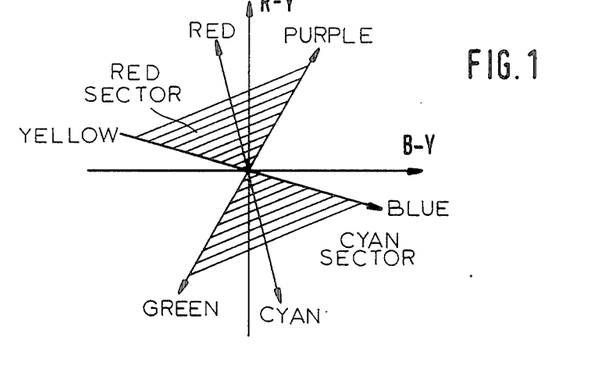
FIG. 1 is a color diagram showing the luminance plane with primary and complementary colors.

The basic or primary colors red, blue and green and likewise the complementary colors cyan, yellow and purple, are shown as sectors in the diagram of FIG. 1. Sector signals are derived by the process described by Monahan and Dischert by which a correction of the colors of any particular sector is possible without affecting the colors lying outside that particular sector. For example, the sectors red and cyan are emphasized in FIG. 1 by parallel line shading. This diagram shows that neighboring sectors overlap each other by half.

Figure 2:
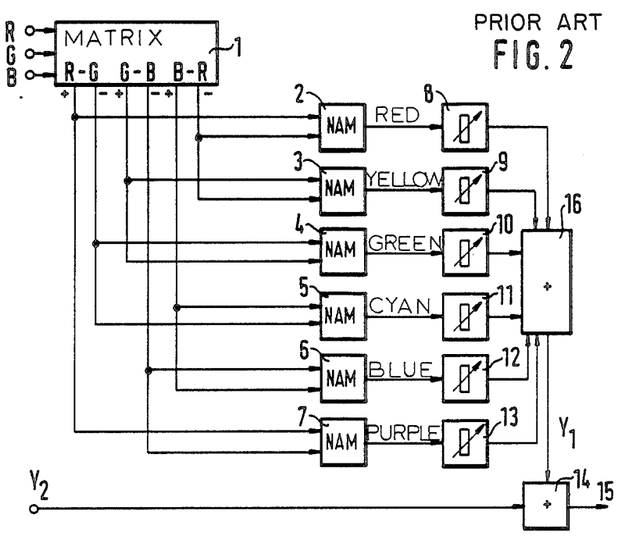
FIG. 2 is a circuit block diagram of a known system.

In the known apparatus illustrated in FIG. 2, difference signals are produced from the color value signals R, G and B in a matrix circuit 1, of which the three outputs for the differences $R-G$, $G-B$ and $B-R$ are provided both with positive and negative polarity. The six difference signals thus made available are provided in pairs to each of six non-additive mixer circuits 2, 3, 4, 5, 6 and 7. Signals are thereby produced at the respective outputs of the mixers in which in every case only those values of the color value signals R, G and B appear which are contained in a particular one of the mutually intersecting sectors. Thus, at the output of the non-additive mixing circuit 2, there is a signal present only when the color value signals together provide a color which lies in the sector designated as "red" in FIG. 1. The same applies to each of the other non-additive mixing circuits 3–7.

The output signals of the mixers 2–7 are then respectively supplied to amplification setting circuits 8 to 13 which, according to requirements, can be constituted either as potentiometers or as amplifiers or controllable amplification and sign, preferably by control through a d.c. voltage value.

The outputs of the amplification adjusting circuits 8 to 13 are connected with inputs of a first addition circuit 16 by which there is produced, in the known circuit, a first luminance signal $Y_1$ which is added to a second luminance signal signal $Y_2$ in a second addition circuit 14. At the output 15 of the latter, there is then a corrected $Y_c$ which is then available for further use.

The disadvantages above mentioned of the circuit of FIG. 2 are now explained with reference to FIG. 3. At levels (a), (b) and (c), there are respectively shown color value signals R, G and B such as they appear, for example in a color bar test picture. At level (d) of FIG. 3, there is shown a luminance signal obtained from a luminance matrix in the conventional way. The numbers appearing on the steps of this luminance signal Y signify the amplitudes of the luminance signal with reference to the white value. From these steps and numbers it is apparent that, for example, yellow has a high luminance component, while the luminance component of blue is very small. The values written on the steps of level (d) of FIG. 3 reflect the well known equation:

$$Y = 0.3R + 0.59Ye + 0.11Bl$$

Figure 3:
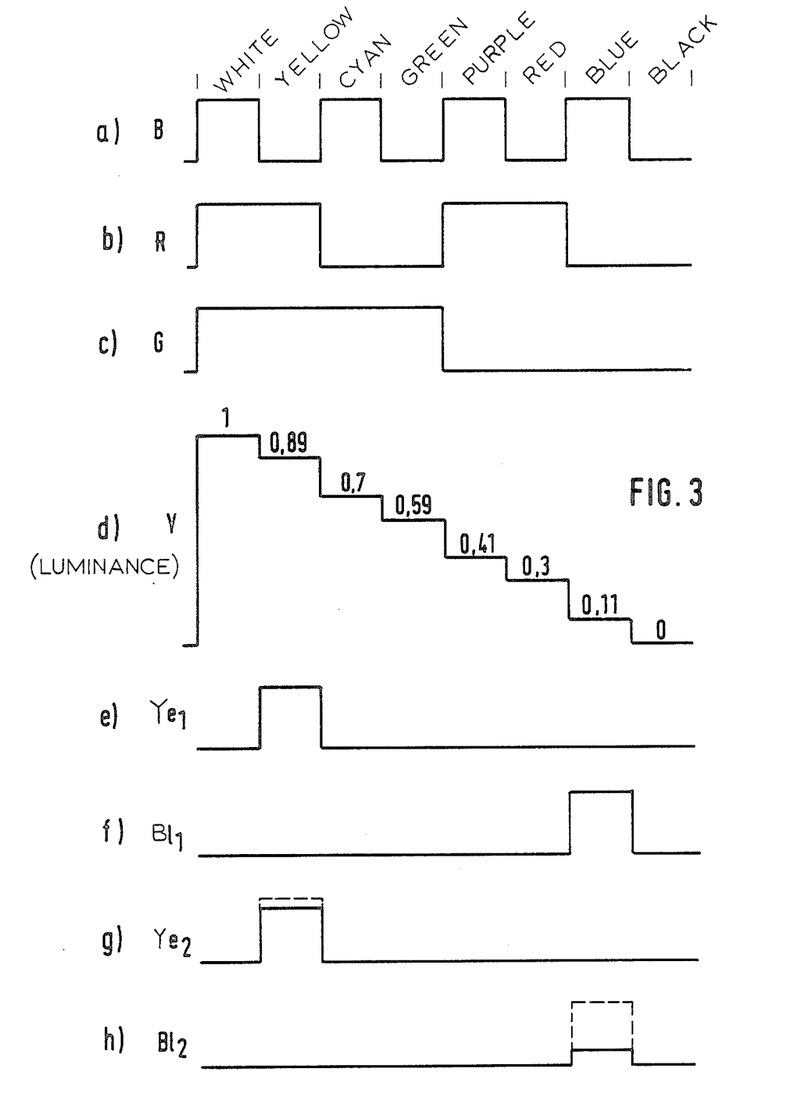
FIG. 3 is a timing diagram for comparatively showing on a common time scale signal waves both of the known system of FIG. 2 and of a system according to the invention, the several signals being shown superimposed at levels in the drawing designated respectively (a), (b), (c), (d), (e), (f), (g) and (h)

At the level (e) and (f) of FIG. 3, there are shown, for example, the respective sector signals $Ye_1$ and $Bl_1$ for the yellow and blue sectors. In the known system illustrated in FIG. 2, the amplitudes of the sector signals are dependent upon the amplitudes of the color value signals B, R and G, which in the example illustrated in FIG. 3, however, are normalized in the pattern of a color bar picture. In correspondence thereto, the sector signals also have a constant amplitude independent of the luminance signal. The adjustment or the correction of the luminance accordingly has substantially less effect for a yellow picture content than, for example, for a blue picture content.

Since in the method and apparatus of the invention no luminance signal is produced from the sector signals for addition to the luminance signal obtained from a luminance matrix, but instead a correction signal is obtained by multiplication by a luminance signal which is preferably band-limited, the effect above described does not take place in the system of the invention. The band-limited signal is designated $Y_b$ in FIG. 4.

The respective correction signals $Ye_2 = Ye_1 \times Y_b$ and $Bl_2 = Bl_1 \times Y_b$ are illustrated at levels (g) and (h) at the bottom of FIG. 3. For comparison with the effect of the known system illustrated in FIG. 2, broken lines in the waves illustrated at levels (g) and (h) of FIG. 3 are added to the solid lines designating the correction signals.

Figure 4:
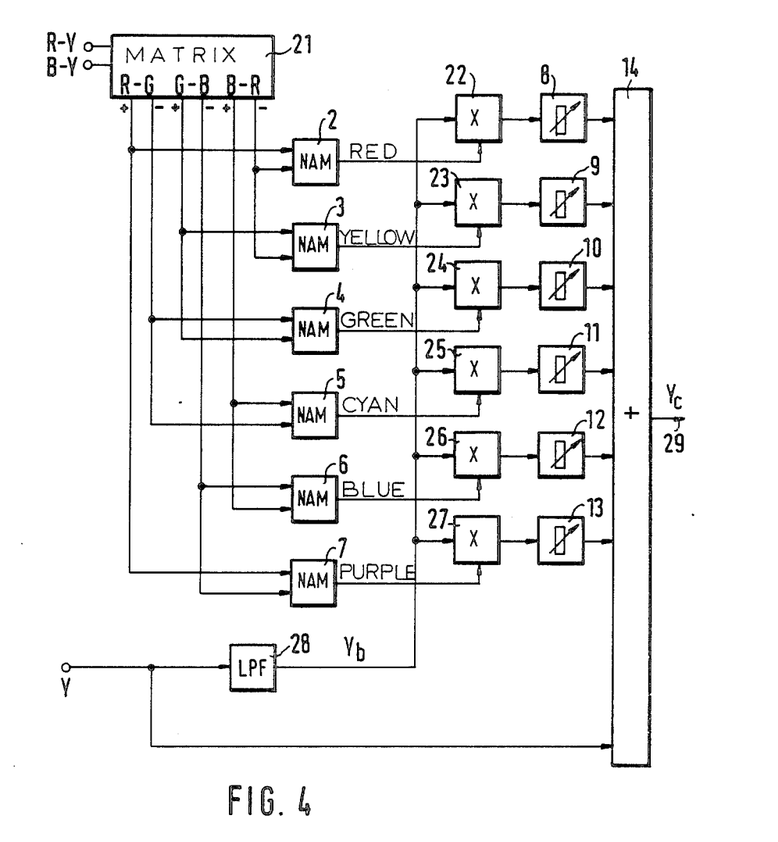
FIG. 4 is a circuit block diagram of a first embodiment of the invention.

In the embodiment shown in FIG. 4, there is a matrix circuit 21 so constituted as to provide the difference signals R−G, G−B and B−R of both positive and negative polarity, out of the input color difference signals R−Y and B−Y, where Y is, of course, the luminance signal. These two difference signals are commonly transmitted in composite video signals of color television. Here again, as explained in connection with FIG. 2, the difference signals obtained from the matrix 21 are supplied in pairs respectively to the non-additive mixer circuits 2–7, at the outputs of which the respective sector signals are made available. In FIG. 4 these sector signals are supplied to respective first inputs of the multiplier circuits 22–27. The second inputs of the respective multiplier circuits are provided with the luminance signal $Y_b$ which has been band-limited by a low-pass filter 28. The outputs of the respective multiplier circuits 22–27 then go to the amplification adjustment circuits 8–13 where both the amplification and the sign (polarity) of the signal can be changed.

The output signals of the amplification adjustment circuits 8–13 are applied to respective inputs of an addition circuit 14 having another input to which the luminance signal Y is applied. There accordingly appears at the output 29 of the addition circuit 14, which is the output of the circuit of FIG. 4, the corrected luminance signal $Y_c$.

It was mentioned in the introduction to the specification that each of the sector signals can be used for changing the hue and the saturation. The present invention relates to correction of the luminance signal, but since part of the circuits shown for correction of the luminance signal can supply the sector signals for adjusting the hue and saturation of the chrominance signals, there is shown in FIG. 4, for completeness, the way the hue and saturation can be adjusted for the red color sector.

Figure 7:
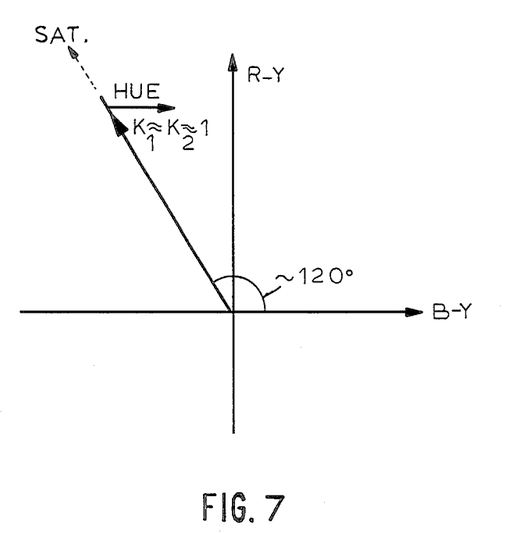
FIG. 7 is a diagram for explaining the saturation and hue alignment shown in FIG. 4.

For this purpose, the red color sector signal coming out of the non-additive mixer 2 is supplied to circuits 41 and 42 for respectively adjusting, for example, by a manually adjustable potentiometer in each case, the hue and the saturation. The output of the hue adjustment circuit 41 is then supplied to addition circuits 47 and 48 respectively in the R−Y and B−Y chrominance lines but only after respectively passing through individual adjustment circuits 43 and 45 for adjusing relative amplitude. FIG. 7 is a diagram illustrating the vector relation of the saturation and hue signals.

Simlarly, the output of the saturation adjustment circuit 42 receives respectively through factor justments 44 and 46 to the saturation control input of the addition circuits 47 and 48. The factors $K_1$, $K_2$ $K_3$ and $K_a$ are in the neighborhood of unity and are designed to provide a differential application of the output of the hue adjustment and likewise of the saturation adjustment output to the R−Y and B−Y lines. As explained in the introduction, the amplification of the sector signals is individually adjustaole so that six adjustable correction signals for hue and six adjustable correction signals for saturation are available and only the colors lying in on sector of the color disc are affected by adjustment of any one correction signal, while the central white point remains unchanged. Reference is made to the publication of patent disclosure mentioned in the introduction for further information regarding the adjustable correction signals for hue and for saturation.

Figure 5:
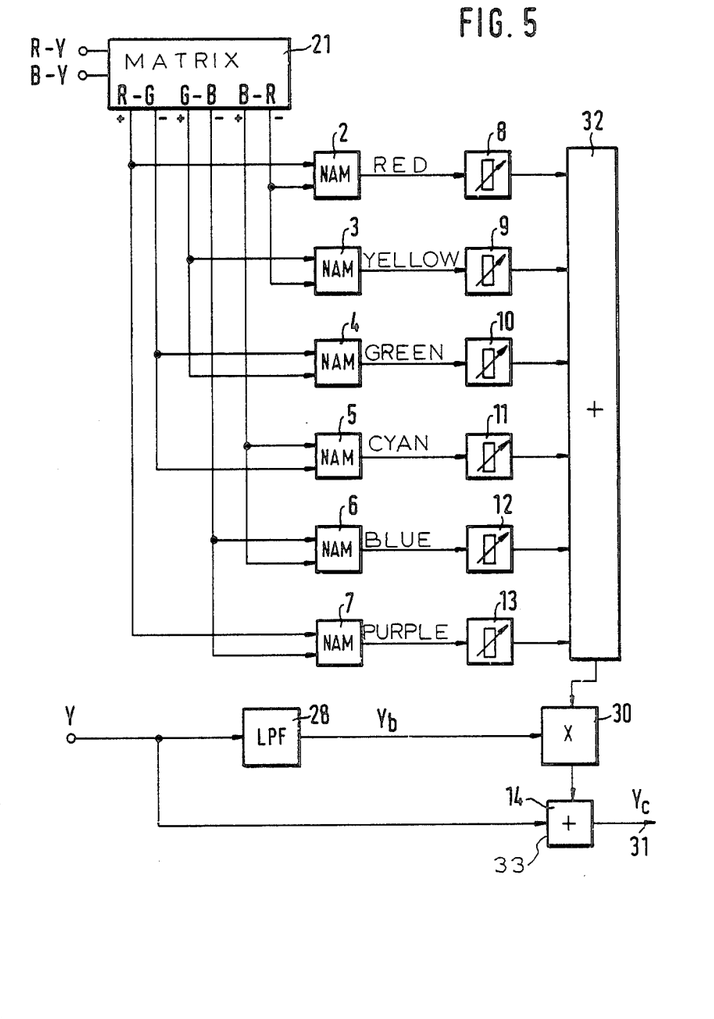
FIG. 5 is a circuit block diagram of a second embodiment of the invention.

FIG. 5 shows a circuit which, like the circuit of FIG. 4, has a matrix 21, non-additive mixer circuits 2–7, amplification adjustment circuits 8–13 and a low-pass filter 28 for the luminance signal Y. In the circuit of FIG. 5, however, instead of multiplication of each individual sector signal by the band-limited luminance signal $Y_b$, the mixing circuit outputs go directly to the amplification adjustment circuits, the outputs of which are then combined into a preliminary correction signal in an addition circuit 32 and that preliminary signal is then multiplied in the multiplier 30 with the band-limited luminance signal $Y_b$. The result of this multiplication is then superimposed, by addition, on the luminance signal Y in the addition circuit 33, at the outputs of which a corrected luminance signal $Y_c$ is made available.

In the embodiments according to FIGS. 4 and 5, the correction is performed on a band-limited luminance signal which is then superimposed additively on a luminance signal that has normal bandwidth. In contrast thereto, in the embodiment of FIG. 6, the luminance signal Y of normal bandwidth is multiplied by the sum of the sector signals. In that operation mixing frequencies arise which correspond to the sum of the frequencies then present in the signals, so that the product of the multiplication of Y with a color signal can therefore go as far as 6.2 MHz. A low-pass filter 35 connected at the output of the multiplier circuit suppresses the spectral components which would lie above the frequency limit of 5 MHz intended for the luminance signal.

If no correction is necessary, the amplification adjustment circuits 8 to 13 are set to zero. Furthermore, the output signals of the amplification adjustment circuits 8 to 13 are zero for those sectors in which the currently present color is not to be found. In such case the luminance signal is to be transmitted to following circuits without modification. This is assured in each of the embodiments of FIG. 4 and FIG. 5 by the fact that the multiplication then has a zero result, so that nothing is added to the luminance signal Y in the following addition.

Figure 6:
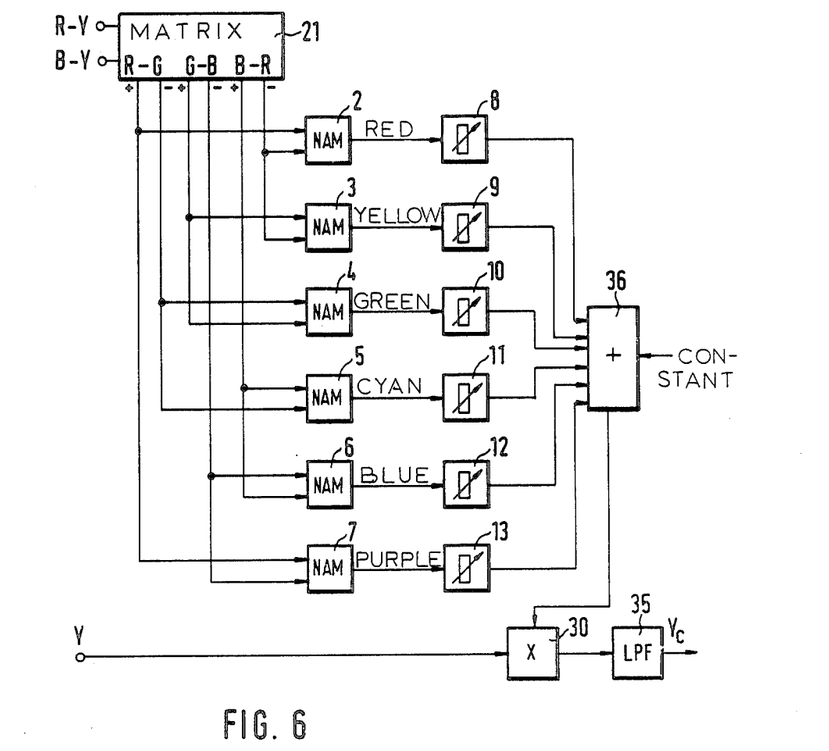
FIG. 6 is a circuit block diagram of a third embodiment of the invention.

In the embodiment of FIG. 6, a constant value is added to the sector signals by means of the addition circuit 36. Then, when the output signals of all amplification adjustment circuits are zero, the luminance signal is merely multiplied by the constant value. If this constant value is equal to 1, the amplitude of the luminance signal remains unaffected, but of course some other value can be supplied in order, for example, to adjust the amplitude of the luminance signal.

Although the invention has been described with reference to particular illustrative example, it will be understood that variations and modifications can be made within the inventive concept.

I claim:

1. In combination with apparatus for adjusting color characteristics of a color television signal including means for producing a luminance signal and color difference signals, means for non-additively mixing said difference signals to produce color sector signals, and means for individually adjusting the amplitude of said color sector signals, apparatus for correcting said luminance signal to accord with relative amplitude adjustments of said color sector signals, said correcting apparatus including means for adding together said amplitude-adjusted color sector signals and means for multiplying at least a lower-frequency portion of said luminance signal by said sector signals so as to ultimately produced the product of the sum of said sector signals and said at least lower frequency portion of said luminance signal.

2. Apparatus for correcting a luminance signal according to claim 1, wherein said means for adding said color sector signals together includes means for adding a constant value to the sum of said sector signals, and wherein said multiplying means is connected for multiplying said luminance signal by the sum of said constant value and said color sector signals to produce a corrected luminance signal.

3. Apparatus for correcting a luminance signal according to claim 2, wherein low-pass filtering means are provided for frequency-band-limiting said corrected luminance signal.

4. Apparatus for correcting a luminance signal according to claim 1, wherein low-pass filtering means are provided for frequency-band-limiting said luminance signal before it is supplied to said means for multiplying at least a lower frequency portion of said luminance signal by said sector signals, and wherein said product of the sum of said sector signals and said at least lower frequency portion of said luminance signal is additively superimposed upon said luminance signal to provide a corrected luminance signal.

5. Apparatus for correcting a luminance signal according to claim 4, wherein the band-limited luminance signal used at the output of said low-pass filter is used to multiply each of said sector signals in an individual multiplier connected between said means for non-additively mixing said difference signals and said means for individually adjusting the amplitudes of said color sector signals.

6. Apparatus for correcting a luminance signal according to claim 4, wherein the band-limited luminance signal used at the output of said low-pass filter is used to multiply the output of said means for adding said amplitude adjusted sector signals together in a single multiplier and wherein the output of said single multiplier is supplied to a second addition means for addition thereto of said luminance signal as it appears before band-limiting by said low-pass filter, in order to produce a corrected luminance signal.

7. Apparatus for correcting a luminance signal according to claim 1 combined with apparatus for adjusting color characteristics of a color television system, wherein said means for adjusting the amplitude of said color sector signals are capable of setting both positive and negative amplitudes of said color sector signals, with a zero amplitude setting signifying that no modification of color signals in that sector is introduced in a color television signal with a zero amplitude occurring in a color sector signal for which said adjusting means setting for that sector is non-zero signifying that there is no color signal present in that sector.

8. Apparatus for correcting a luminance signal according to claim 2 combined with apparatus for adjusting color characteristics of a color television system, wherein said means for adjusting the amplitude of said color sector signals are capable of setting both positive and negative amplitudes of said color sector signals, with a zero amplitude setting signifying that no modification of color signals in that sector is introduced in a color television signal and with a zero amplitude occurring in a color sector signal for which said adjusting means setting for that sector is non-zero signifying that there is no color signal present in that sector.

9. Apparatus for correcting a luminance signal according to claim 3 combined with apparatus for adjusting color characteristics of a color television system, wherein said means for adjusting the amplitude of said color sector signals are capable of setting both positive and negative amplitudes of said color sector signals, with a zero amplitude setting signifying that no modification of color signals in that sector is introduced in a color television signal and with a zero amplitude occurring in a color sector signal for which said adjusting means setting for that sector is non-zero signifying that there is no color signal present in that sector.

10. Apparatus for correcting a luminance signal according to claim 4 combined with apparatus for adjusting color characteristics of a color television system, wherein said means for adjusting the amplitude of said color sector signals are capable of setting both positive and negative amplitudes of said color sector signals, with a zero amplitude setting signifying that no modification of color signals in that sector is introduced in a color television signal and with a zero amplitude occurring in a color sector signals for which said adjusting means setting for that sector is non-zero signifying that there is no color signal present in that sector.

11. Apparatus for correcting a luminance signal according to claim 5 combined with apparatus for adjusting color characteristics of a color television system, wherein said means for adjusting the amplitude of said color sector signals are capable of setting both positive and negative amplitudes of said color sector signals, with a zero amplitude setting signifying that no modification of color signals in that sector is introduced in a color television signal and with a zero amplitude occurring in a color sector signals for which said adjusting means setting for that sector is non-zero signifying that there is no color signal present in that sector.

12. Apparatus for correcting a luminance signal according to claim 6 combined with apparatus for adjusting color characteristics of a color television system, wherein said means for adjusting the amplitude of said color sector signals are capable of setting both positive and negative amplitudes of said color sector signals, with a zero amplitude setting signifying that no modification of color signals in that sector is introduced in a color television signal and with a zero amplitude occurring in a color sector signals for which said adjusting means setting for that sector is non-zero signifying that there is no color signal present in that sector.

13. Apparatus for correcting a luminance signal according to claim 1 combined with apparatus for adjusting color characteristics of a color television signal wherein said non-additive mixing means for paired color difference signals are six in number and connected for respectively delivering six color sector signals corresponding to three primary colors and the respective complementary colors of said primary colors.

14. Apparatus for correcting a luminance signal according to claim 2 combined with apparatus for adjusting color characteristics of a color television signal wherein said non-additive mixing means for paired color difference signals are six in number and connected for respectively delivering six color sector signals corresponding to three primary colors and the respective complementary colors of said primary colors.

15. Apparatus for correcting a luminance signal according to claim 3 combined with apparatus for adjusting color characteristics of a color television signal wherein said non-additive mixing means for paired color difference signals are six in number and connected for respectively delivering six color sector signals corresponding to three primary colors and the respective complementary colors of said primary colors.

16. Apparatus for correcting a luminance signal according to claim 4 combined with apparatus for adjusting color characteristics of a color television signal wherein said non-additive mixing means for paired color difference signals are six in number and connected for respectively delivering six color sector signals corresponding to three primary colors and the respective complementary colors of said primary colors.

17. Apparatus for correcting a luminance signal according to claim 5 combined with apparatus for adjusting color characteristics of a color television signal wherein said non-additive mixing means for paired color difference signals are six in number and connected for respectively delivering six color sector signals corresponding to three primary colors and the respective complementary colors of said primary colors.

18. Apparatus for correcting a luminance signal according to claim 6 combined with apparatus for adjusting color characteristics of a color television signal wherein said non-additive mixing means for paired color difference signals are six in number and connected for respectively delivering six color sector signals corresponding to three primary colors and the respective complementary colors of said primary colors.

* * * * *